Jan. 6, 1970  LEO MORI ET AL  3,488,511
AUTOMATIC IDENTIFYING APPARATUS OF POSTAGE
STAMP INDICATIONS
Filed Oct. 19, 1967  9 Sheets-Sheet 1

LEO MORI,
ISAMU NIIKURA,
TUYOSHI ISHIDA,
HIROSHI ARITA, &
HIROSHI TAMURA,
INVENTORS by Stephen H. Frishauf

United States Patent Office 3,488,511
Patented Jan. 6, 1970

3,488,511
AUTOMATIC IDENTIFYING APPARATUS OF POSTAGE STAMP INDICATIONS
Leo Mori, Tokyo, Isamu Niikura, Hiratsuka-shi, and Tuyoshi Ishida, Hiroshi Arita, and Hiroshi Tamura, Yokohama-shi, Japan, assignors to Tokyo Shibaura Electric Co., Ltd., Kawasaki-shi, Japan, a corporation of Japan
Filed Oct. 19, 1967, Ser. No. 676,591
Claims priority, application Japan, Oct. 25, 1966, 41/70,339; Oct. 31, 1966, 41/71,514, 41/71,610; Dec. 8, 1966, 41/80,061; Feb. 22, 1967, 42/10,927
Int. Cl. G01j 3/34, 3/50
U.S. Cl. 250—226                                6 Claims

ABSTRACT OF THE DISCLOSURE

Apparatus for identifying a postage stamp on postal matters and having a pattern and a margin, at least one pair of opposing edges of said pattern having a chromatic color capable of being discriminated from said margin in the spectral reflection and absorption bands in the visible region of radiation comprising optical systems, each including means to illuminate the opposing edges and means to convert light rays reflected from the illuminated edges to electrical signals and an electrical system having logic circuits to which the electrical signals are applied to produce postage stamp indicating signals corresponding to the chromatic color of the pattern.

---

This invention relates to an automatic identifying apparatus of postage stamps adapted to identify and detect patterns of predetermined colours, especially postage stamps which are printed or put on postal matters such as post cards or envelopes.

In automatic treating machines for postal matters, various automatic machines and devices are required to properly arrange letters, to sort special postal matters such as special delivery mails and to apply postmarks. The typical example of such machines is an automatic identifying apparatus which operates to identify and detect the type of coloured patterns such as postage stamps applied on the surface of letters.

These identifying apparatus are designed to treat letters of a predetermined size having a predetermined coloured pattern at a predetermined position and when operating these apparatus letters are conveyed along a predetermined path, the surface of letters are illuminated by a source of light, and partially reflected light from the surface of letters is measured whereby to detect the characteristics of the coloured patterns by judging the variation in the reflected light.

According to the prior identifying apparatus of the type referred to above, letters are passed at a constant speed under a light spot emanating visible light rays to scan postage stamps applied on letters along a straight line, the reflected light rays from the postage stamps are received by a photoelectric light receiver to convert the reflected light rays into electric output waves, and signals inherent to the postage stamps contained in the output waves are identified and detected by a succeeding logic circuit. In such an apparatus, signals are produced in the output waves due to postage stamps, alphabets, printed matters and the like applied on the surface of postal matters and discrimination between signals caused by postage stamps and those caused by printed matters or the like is made by utilizing the fact that the interval between trailing and leading edges of signals generated at opposite ends of a postage stamp of a particular colour pattern conveyed at a constant speed beneath the light spot is constant for a postage stamp of a predetermined configuration. If the tolerance for the variation of said interval were made large by taking into consideration the variation in the running speed of letters there will be a problem of identifying and detecting signals caused by postage stamps. Even if a complicated logical circuit were employed to obviate such difficulty, the probability of causing erroneous operations would be increased.

This invention is based on the discovery that the difficulties of the prior art device are caused by the utilization of a single light spot and the invention contemplates to provide an automatic identifying apparatus for coloured patterns, particularly postage stamps and postage impressions, wherein two light spots are utilized which are spaced apart by a distance approximately equal to or less than the distance between opposite ends of the coloured pattern along the scanning line and wherein only the predetermined colour pattern is correctly detected and identified from signals produced by light spots by a succeeding logic circuit whereby to decrease erroneous operation.

Further objects and advantages of the present invention will become apparent and the invention will be better understood from the following description, reference being made to the accompanying drawings, in which:

Figure 1:
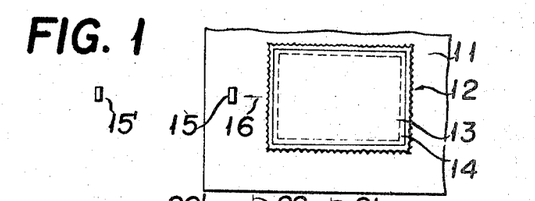
FIG. 1 depicts the positional relation between a postage stamp to be identified and detected and applied on a postal matter, and two light spots adapated to scan the postage stamp.

Referring now to the accompanying drawings, FIG. 1 shows the relation between a postage stamp indication having a pattern to be identified by the apparatus and two light spots thereof. The term "postage stamp indication" herein used is intended to mean a postage stamp or a postage impression affixed or otherwise directly printed at a prescribed position on a letter envelope or a post card. For example, a postage stamp 12 applied on the surface of a letter 11 has a rectangular pattern portion 13 of 22.5 millimetres, 18.5 millimetres wide and a peripheral portion 14 having a width of 0.5 millimetre and printed with a saturated color having selective spectral reflectance. The spacing between centres of two light spots 15 and 15' is equal to the longitudinal dimension of the pattern portion 13. Two light spots 15 and 15' are scanned in the direction of an arrow 16 with respect to the postage stamp 12. It is assumed that the letter 11 has prescribed dimensions, and that the postage stamp 12 is applied to a prescribed position on the surface of the letter to be illuminated and scanned by light rays from light spots 15 and 15'.

Figures 2, 3:
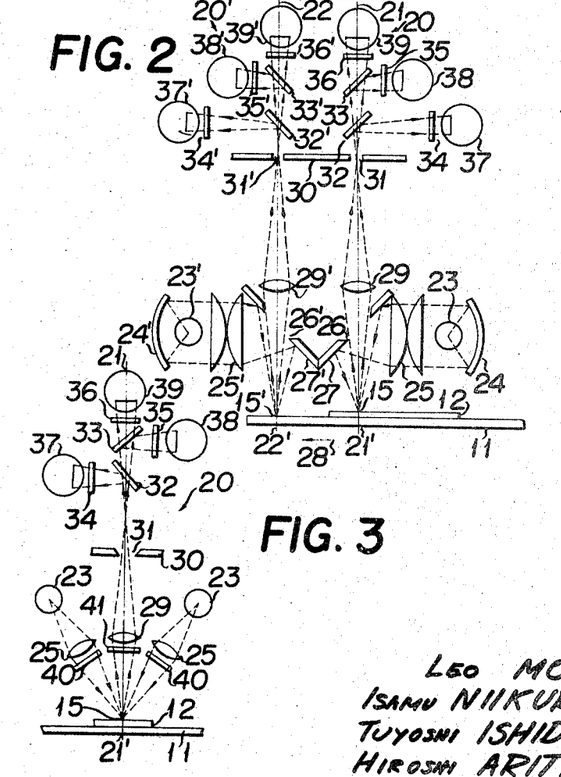
FIG. 2 is a plan view to illustrate an optical system utilized in this invention.
FIGS. 3 and 4 are plan views of modified optical systems.

FIG. 2 is a plan view of the principal portions of an optical system of the apparatus of this invention. The optical system comprises two sets of symmetrical optical systems 20 and 20' having optical axes 21–21' and 22–22' spaced apart from each other by a distance equal to the longitudinal dimension of the pattern portion of the postage stamp. Light rays emanating from light sources 23 and 23' are projected as light spots 15 and 15' on a portion of the letter 11 having the postage stamp 12 by means of spherical reflecting mirrors 24 and 24', condenser lenses 25 and 25' and plane reflecting mirrors 27 and 27' provided with slits 26 and 26'. The letter 11 is moved in the direction of an arrow 28 at a substantially constant speed of the order of several metres per second by means of a mechanical drive means including a driving motor, belt and the like, not shown. Light rays reflected from a portion of the surface of the letter illuminated by respective light spots 15 and 15' are focused on a plane containing slits 31 and 31' provided through a plate 30 by means of projection lenses 29 and 29' and through slits 26 and 26' of the plane reflecting mirrors 27 and 27', respectively. The slits 31 and 31' of the plate 30 serve to limit the effective area of light spots 15 and 15' and the effective spacing therebetween. Through slits 31 and 31' pass only light rays reflected from predetermined areas (0.5 mm. in width and several mm. in length, for example) of the two light spots 15 and 15' separated by a predetermined spacing such as 22.5 mm., for example. Light rays limited by these slits 31 and 31' are divided into three light beams by means of dichroic mirrors 32, 32' and 33 and 33' to be projected upon photoelectric light receivers 37, 37'; 38, 38' and 39, 39' through respective colour filters, for example, red filters 34 and 34', green filters 35 and 35' and blue filters 36 and 36' which, respectively, pass red, green and blue light rays.

FIG. 3 shows an alternative optical system illustrating only one of two sets of symmetrical optical systems. Similar parts as in FIG. 2 are designated by the same reference numerals. Light rays emanated from a pair of light sources 23 are focused as a light spot 15 on a line across the postage stamp 12 applied on the letter 11, by means of a pair of condenser lenses 25 and through a pair of polarized light filters 40, the postage stamp 12 being moved at a constant speed out of the plane of the drawing. A portion of the diffused reflected light rays from the illuminated portion is focused upon a plane including a slit 31 in a plate 30 by means of a projection lens 29 after passing through a polarized light filter 41. After passing through the slit 31, the light rays are divided into three light beams by means of two types of dichroic mirrors 32 and 33 in the same manner as the optical system shown in FIG. 2 to be received by photoelectric light receivers 37, 38 and 39 through red, green and blue filters 34, 35 and 36, respectively.

In this optical system, the polarized light filter 41 is included in the path of reflected light rays to permit only the polarized light component of the light rays reflected from the postage stamp 12, which is perpendicular to the polarization of incident light rays from light source 23, to arrive at the plate 30. The polarized light component is then analyzed into three colours which are received by respective photoelectric light receivers 37, 38 and 39.

It is assumed now that the direction of polarizaton of polarizing filters 40 and 41 (mainly the direction of the electric vector of the polarized light transmitted) is any one of the following.

(I) The direction of polarized light of polarizing filters 40 and 40 inserted in the projected light path is determined such that the direction of the electric vector of the illuminating light would be parallel to the plane of incidence, while the direction of polarized light of the polarizing filter 41 inserted in the reflected light path would be perpendicular to the plane of incidence.

(II) The direction of polarization of polarizing filters 40 and 40 is determined such that the direction of the electric vector would be perpendicular to the plane of incidence whereas the direction of the polarized light of the polarizing filter 41 would be parallel to the plane of incidence.

By arranging polarizing filters such that the direction of polarized light is perpendicular to the illuminating light path as well as to the reflected light path as above described, the quantity of light incident at the photoelectric receivers will be attenuated to about 10 to 20 percent when compared with an optical system of similar construction, but not including polarizing filters. It would be possible to completely eliminate the specular reflection component directly reflected from the surface of an object. For this reason, only the components that pass through the polarizing filter 41 among light rays that slightly penetrate into the interior of the pattern on the surface of the object, can reach the respective photoelectric light receivers through the dichroic mirrors, where their quantities are detected, said interior being subjected to selective absorption according to wave length and then coming out as diffused reflected light rays (during this process the direction of polarized light will be varied at random to form natural light).

As a result, the ratio between the spectral reflection band and absorption band of a postage stamp applied on the letter is greatly improved.

Below is an example to explain the function and merit of the optical system of the present invention. In this example, use was made of a pattern written on the surface of a white sheet of paper with conventional red printing ink instead of a letter with a postage stamp. The ratio between the red spectrum component corresponding to the reflection band and the green spectrum component corresponding to the absorption band was measured by an optical system identical to that shown in FIG. 3 but not including the polarizing filter, and a value of approximately 35 was obtained. The measurement was then made on the identical sample by utilizing the optical system shown in FIG. 3 and a value of approximately 100 was obtained in the case of (I) wherein parallel polarized light illumination and perpendicular polarized light receipt was utilized, whereas a value of approximately 90 was obtained in the case of (II) wherein perpendicular polarized light illumination and parallel polarized light receipt were used. Thus in this experiment, with the optical system shown in FIG. 3, the colour ratio was increased by a factor of about 2.5, which showed that the optical system of this invention can readily detect and discriminate colours of coloured patterns such as coloured postage stamps.

Instead of inserting independent polarizing filters in an illuminating light path and a reflected light path as in the optical system shown in FIG. 3, a simplified optical system utilizing a polarization interference filter by a plurality of thin film layers may be used with equal results. This filter comprises alternate layers of high refractive index and of low refractive index. Interference due to reflection at the interface between the two layers is utilized to reflect polarized light rays in one direction, while to transmit polarized light rays in a direction perpendicular to the first-said direction.

Figures 4, 6, 9:
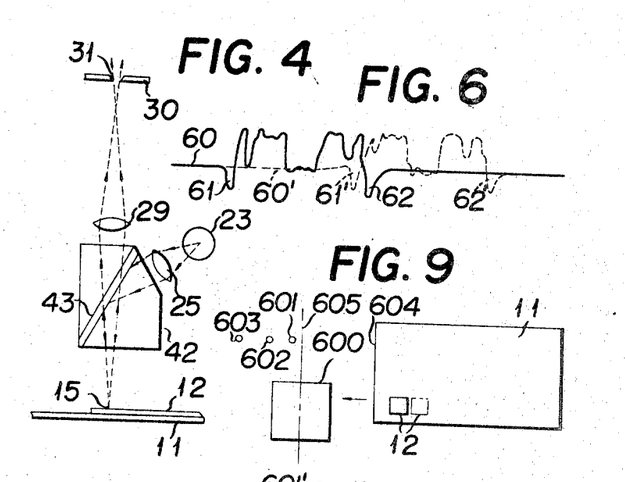
FIG. 6 shows a waveform of a signal generated by respective preamplifiers included in the circuit shown in FIG. 5A.
FIG. 9 shows one example of the relative position between the identifying apparatus, a terminal detecting element of means for limiting portions to be detected incorporated to the apparatus, and a postal matter with a stamp to be identified and detected and which runs beneath the terminal detecting elements.

FIG. 4 shows the construction of one example of such a simplified optical system wherein light rays from a light source 23 are focused by a condenser lens 25, then are reflected by the multilayered thin films 43 of a polarization interference filter block 42 to illuminate the scanned surface of the letter 11 with a postage stamp 12 applied thereon. Light rays reflected from the letter are again projected upon the polarization interference filter block 42. A portion of light rays reflected from the scanned surface transmits through multilayered thin films 43 and is then focused upon a plane including the slit 31 of the plate 30 by means of a projection lens 29. The remainder of the optical system behind the plate 30 may be identical to that illustrated in FIG. 2 or 3. In this embodiment the direction of the illuminating light and that of the reflected light are substantially normal to the plane to be scanned so that the plane to be scanned will be scanned by polarized light having an electrical vector perpendicular to the plane of the diagram. Of the reflected light rays from the surface to be scanned only the polarized light component parallel to the plane of the diagram will be detected by the light receiver.

Thus, it will be noted that, with the optical system shown in FIG. 4, it is possible to eliminate the effect of the specular reflection component of the reflected light from an article with a coloured pattern to be identified, particularly a postal matter applied with a postage stamp whereby effective and accurate detection of the coloured pattern and accurate identification of colours are possible.

Figure 5A:
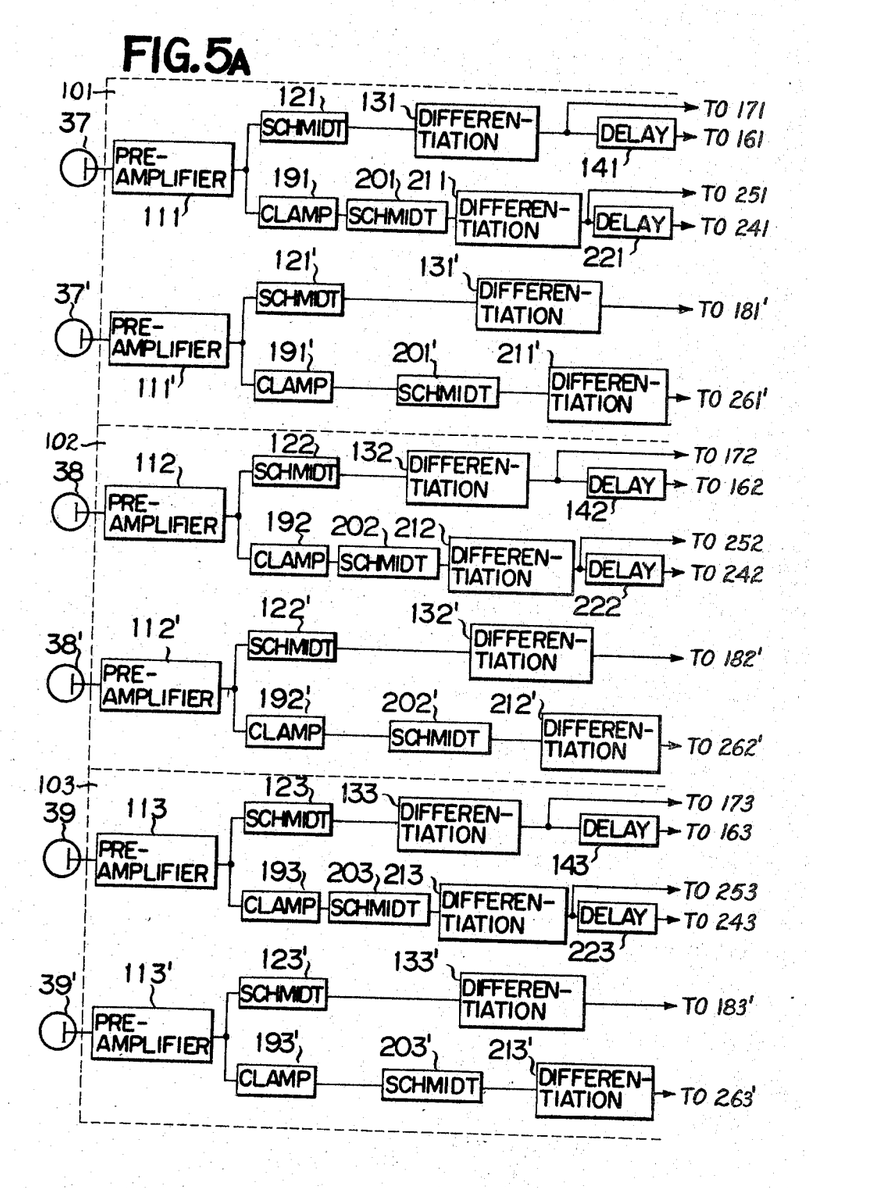
FIGS. 5A and 5B are divided views showing a circuit diagram illustrating one example of an electrical system of the novel apparatus utilized to identify the postage stamp shown in FIG. 1.
Figure 5B:
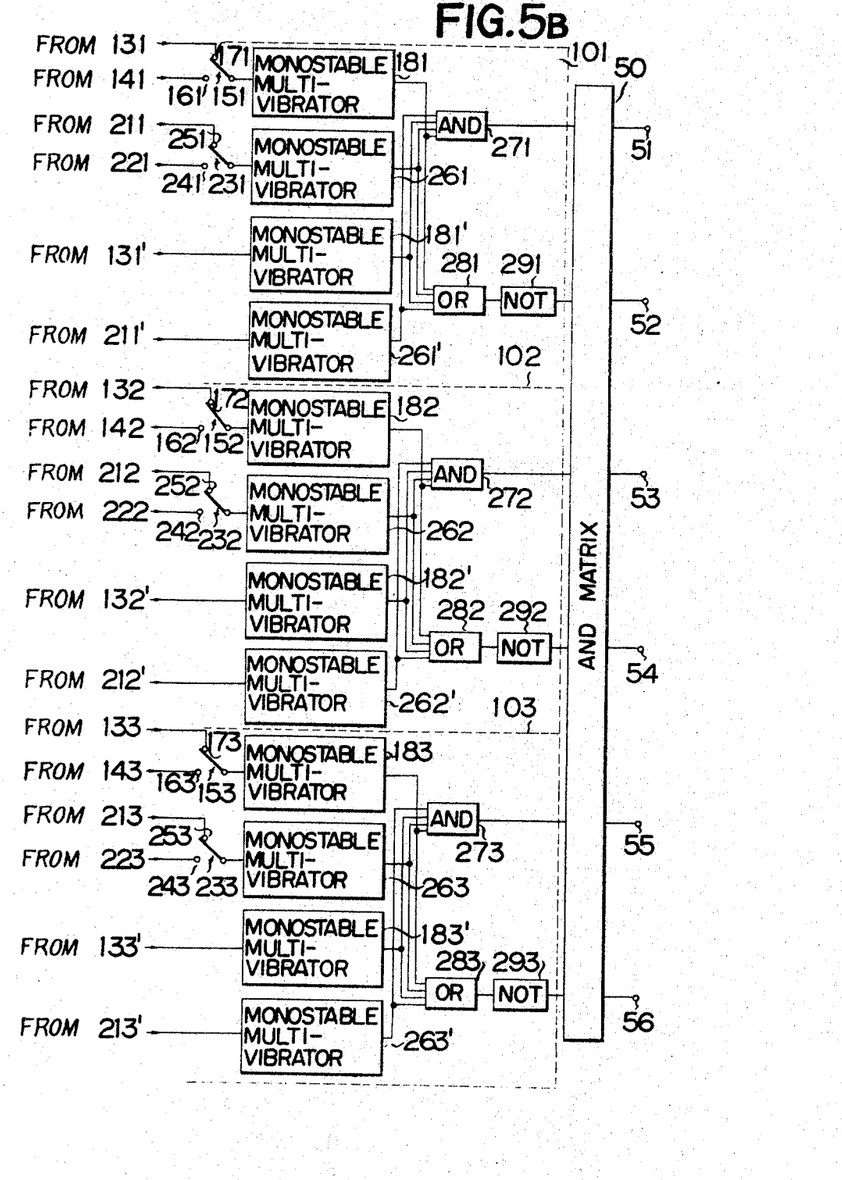

Turning now to FIGS. 5A and 5B, pairs of photoelectric light receivers 37, 37'; 38, 38' and 39, 39' respectively convert red, green and blue light rays transmitted through red, green and blue filter pairs 34, 34'; 35, 35' and 36, 36' respectively (see FIG. 2) into electric signals, which electric signals are applied to independent logical circuits 101, 102 and 103, respectively, for different respective colours, viz., red, green and blue. The input signals from the pairs of receivers 37, 37'; 38, 38' and 39, 39' are fed to respective pairs of preamplifiers 111, 111'; 112, 112' and 113, 113' in logic circuits 101, 102 and 103, respectively. Output signals from these preamplifiers are respectively applied to Schmidt trigger circuits 121, 121'; 122, 122' and 123, 123'. Of these Schmidt trigger circuits, circuits 121, 122 and 123 are connected to differentiation circuits 131, 132 and 133 which serve to derive signals corresponding to the trailing edges of the outputs of the Schmidt trigger circuits. The outputs of the differentiation circuits are respectively connected to contacts 161, 162 and 163 of switches 151, 152 and 153 via delay circuits 141, 142 and 143. These outputs are also directly connected to contacts 171, 172 and 173 of said switches which are respectively connected to monostable multivibrators 181, 182 and 183. Outputs from said preamplifiers 111, 112 and 113 are branched and connected to differentiation circuits 211, 212 and 213 which derive signals corresponding to the leading edges of the output of the Schmidt circuits through clamp circuits 191, 192 and 193 for colour levels and through Schmidt circuits 201, 202 and 203. The output terminals of differentiation circuits 211, 212 and 213 are connected to contacts 241, 242 and 243 of switches 231, 232 and 233 respectively through respective delay circuits 221, 222 and 223. The outputs of differentiation circuits 211, 212 and 213 are also directly connected to the contacts 251, 252 and 253 of said respective switches 231, 232 and 233. The switches 231, 232 and 233 are connected to monostable multivibrators 261, 262 and 263, respectively. Output terminals of amplifiers 111', 112' and 113' are respectively coupled to monostable multivibrators 181', 182' and 183' through respective Schmidt circuits 121', 122' and 123' operating at a constant colour level and respective differentiation circuits 131', 132' and 133' which derive signals corresponding to the leading edge component of the output from the Schmidt circuits. Amplifiers 111', 112' and 113' are also connected to clamp circuits 191', 192' and 193' which are respectively connected to monostable multivibrators 261', 262' and 263' through Schmidt circuits 201', 202' and 203' and differentiation circuits 211', 212' and 213' which derive signals corresponding to the leading edge components from the outputs thereof. Outputs from monostable multivibrators 181, 181' and 261, 261' for the red circuit are supplied to an AND circuit 271 and an OR circuit 281. Output from the AND circuit 271 is directly supplied to an AND matrix 50 while the output from the OR circuit 281 is connected to the AND matrix through a NOT circuit 291. Similarly the outputs from the monostable multivibrators 182, 182' and 262, 262' for the green circuit are supplied to an AND circuit 272 and an OR circuit 282, respectively. Output from the AND circuit 272 is directly applied to said AND matrix 50 while the output from the OR circuit 282 is applied to the same AND matrix through a NOT circuit 292. Similarly, the outputs from the monostable multivibrators 183, 183' and 263, 263' for the blue circuit are applied to the AND matrix 50 through an AND circuit 273 and through an OR circuit 283 and a NOT circuit 293, respectively. The AND matrix 50 is so constructed and arranged as to produce an output signal from the six output terminals 51, 52, 53, 54, 55 and 56, respectively, when input signals 1, $\bar{2}$, $\bar{3}$; $\bar{1}$, 2, $\bar{3}$; $\bar{1}$, $\bar{2}$, 3; $\bar{1}$, 2, 3; 1, $\bar{2}$, 3; and 1, 2, $\bar{3}$ are applied, where 1, 2, 3 represent the output of the AND circuits 271, 272 and 273, respectively, while $\bar{1}$, $\bar{2}$, $\bar{3}$ represent the output of the NOT circuits 291, 292 and 293, respectively. Since the symbols 1, 2, 3 and $\bar{1}$, $\bar{2}$, $\bar{3}$ indicate respectively the presence and absence of red, green and blue, colour signals of six types can be classified with a proper combination of these symbols.

The operation of the automatic identifying apparatus will be described by reference to a case wherein the postage stamp 12 shown in FIG. 1 is printed with a cyanic ink that strongly absorbs the red portion of the spectrum of light but substantially reflects green and blue portions and wherein the postage stamp is scanned in the longitudinal direction thereof by light spots 15 and 15'. In order to detect a postage stamp applied in the longitudinal direction, switches 151, 152, 153; and 231, 232 and 233 are thrown to contacts 171, 172, 173; 251, 252 and 253. It is to be understood that these switches are interlocked so that they are switched simultaneously with a single operation.

When the postage stamp is scanned, output signals from the preamplifiers 111 and 111' for photoelectric light receivers 37 and 37' including red filters 34 and 34' have waveforms as shown in FIG. 6. The solid line waveform 60 shows the output from the preamplifier 111 when the letter 11 runs beneath the light spot 15 whereas the dashed line waveform 60' shows the output signal from the preamplifier 111' (see FIG. 5a). Horizontal portions on the opposite sides of waveforms 60 and 60' represent the signal generated by the letter while the portion between these horizontal portions represents the signal caused by the postage stamp 12. Valleys 61, 62 and 61', 62' at leading and trailing edges at respective ends of the postage stamp signal correspond to white marginal portions of the periphery 14 of pattern 13 of the postage stamp 12, whereas portions between valleys 61 and 62 and between valleys 61' and 62' represent the coloured pattern of the postage stamp 12. Variations from colour to white and white to colour at valleys 62 and 61' occur simultaneously.

The output from the preamplifier 111 above a definite colour level is converted into a rectangular wave by means of the Schmidt circuit 121 which is applied to the differentiation circuit 131. The differentiation circuit 131 operates to detect the change from colour to white thus setting the monostable multivibrator 181 for a definite time interval. Further, the output from the amplifier 111 is fed to the clamp circuit 191 where the potential level of the input waveform corresponding to the coloured portion of the stamp is clamped to the zero level and a sharp waveform that shows the change from the coloured portion to white is generated. Said sharp waveform is converted into a rectangular waveform by the Schmidt circuit 201 and the leading edge thereof is detected by the differentiation circuit 211 whose output triggers the monostable multivibrator 261. Similarly, the output from the preamplifier 111' above a definite colour level is also converted into a rectangular wave by means of the Schmidt circuit 121' and the differentiation circuit 131' operates to detect the change from white to colour, and trigger the monostable multivibrator 181'.

The clamp circuit 191' clamps the potential level corresponding to the white portion of the stamp to the zero level and generates a sharp waveform that shows the change from the white to the coloured portion. Said sharp waveform is converted into a rectangular waveform by the Schmidt circuit 201', and the leading edge thereof is detected by the differentiation circuit 211' whose output triggers the monostable multivibrator 261'. Usually the operating time of monostable multivibrators 181 and 181' is pre-set to be longer than that of monostable multivibrators 261 and 261'. Then when portions 62 and 61' of the output waveform shown in FIG. 6 occur simultaneously, AND circuit 271 will generate a "1" signal whereas OR circuit 281 and NOT circuit 291 will not generate a "$\bar{1}$" signal. However, as the photoelectric light receivers 38 and 38' which receive the green portion of the spectrum and the photoelectric light receivers 39 and 39' that receive the blue portion do not generate any appreciable signal wave, AND circuits 272 and 273 will not provide signals "2" and "3" whereas NOT circuits 292 and 293 provide signals "$\bar{2}$" and "$\bar{3}$," AND matrix 50 is supplied with signals "1," "$\bar{2}$" and "$\bar{3}$" to provide signals "1," "$\bar{2}$" and "$\bar{3}$," or signals denoting that the postage stamp under examination is printed with cyanic ink, on the output terminal 51 of the AND matrix 50. In the same manner when a magenta postage stamp is scanned, signals "$\bar{1}$," "2" and "$\bar{3}$" will appear on the output terminal 52. In the case of scanning a red postage stamp, signals "$\bar{1}$," "2" and "3" will appear on the output terminal 54 whereas in the case of green and bluish purple stamps, signals "1," "$\bar{2}$" and "3" and "1," "2" and "$\bar{3}$" will appear respectively on the output terminals 55 and 56.

In the case of scanning patterns on the surface of a letter, such as alphabets resembling a postage stamp, when the AND condition provided by the AND circuit and the OR–NOT condition provided by the OR and NOT circuits are satisfied at the same time for all of three colour circuits the probability that the AND matrix provides a signal is very small.

Scanning in the transverse direction of the postage stamp will now be considered. At first interlocked transfer switches 151, 152, 153 and 231, 232, 233 are thrown to contacts 161, 162, 163 and 241, 242, 243. In this case the transition 62 from colour to white of the output waveform from the preamplifier 111 and the transition 61' from white to colour of the output waveform from the preamplifier 111' will not occur simultaneously as shown in FIG. 6. Thus, for example, the transition 62 precedes the transition 61'. Since it was assumed that the longitudinal dimension of the printed surface of the postage stamp is 22.5 millimetres and the transversal dimension is 18.5 millimetres the time difference between them is equal to the time required for the letter 11 to travel a distance of 4 millimetres (which is equal to about 1.3 milliseconds for the running speed of 3 metres per second). Because switches 151, 152, 153; 231, 232, 233 are thrown to contacts 161, 162, 163; 241, 242, 243, delay circuits 141, 142, 143; 221', 222', 223' are respectively interposed between the differentiation circuits 131, 132 and 133 and monostable multivibrators 181, 182 and 183 and between the differentiation circuits 211, 212 and 213 and monostable multivibrators 261, 262 and 263 to provide a time delay corresponding to said time difference (about 1.3 milliseconds), thus assuring operation identical to that already described.

The embodiment shown in FIGS. 5A and 5B has the following features:

(1) It is possible to detect and identify colours of postage stamps not only applied longitudinally but also transversely;

(2) Limitation upon the pattern of postage stamps is simple. The pattern must only have coloured edges of predetermined dimensions;

(3) It is possible to more precisely determine the dimension of the pattern area of the postage stamp irrespective of the running speed of the letter than the prior art apparatus wherein a single light spot is employed. As a result the probability of producing erroneous signals caused by similar alphabets or printed matters can be reduced.

Since delay circuits are used to detect postage stamps applied on the letter transversely the stability of the running speed of the postage stamp causes some problems. But in this case, as the delay is made for a length of about 4 millimetres the effect of instability of the running speed is greatly reduced when compared with an arrangement wherein a single light spot is utilized for scanning and a delay is made for dimensions of 22.5 millimetres long and 18.5 millimetres wide.

Although in this embodiment photoelectric light receivers respectively responsive to red, green and blue to receive reflected light rays from respective light spots are used, two or more light receivers having different spectrum sensitivities may be used. Further, while in this embodiment, longitudinally applied postage stamps and laterally applied postage stamps are detected independently by utilizing switches, it may be possible to detect postage stamps by providing separate detecting circuits for longitudinally applied postage stamps and laterally applied postage stamps and an OR circuit energized by the outputs from said separate detecting circuit whether the postage stamps are being applied longitudinally or laterally. Further while in this embodiment the spacing between two light spots has been shown to be equal to the longitudinal dimension of the postage stamp, the spacing may be equal to the lateral dimension of the postage stamp. In this case delay circuits 141, 142, 143; 221, 222, 223 and switches 151, 152, 153; 231, 232, 233 are removed from between the differentiation circuits 131, 132 and 133 and the monostable multivibrators 181, 182 and 183 and between the differentiation circuits 211, 212 and 213 and the monostable multivibrators 261, 262 and 263 but inserted respectively between the differentiation circuits 131', 132' and 133' and the monostable multivibrators 181', 182' and 183' and between differentiation circuits 211', 212' and 213' and the monostable multivibrators 261', 262' and 263'. This arrangement can operate in the same manner as above described.

Insertion of delay circuits in both of said circuits enables the value of the spacing between two light spots to be set to any value intermediate of the longitudinal dimension and the lateral dimension of the printed area of the postage stamp. Further, with this embodiment a postage stamp detection signal is generated when the scanning of the pattern area of the postage stamp by the first light spot is finished and the scanning of the pattern area by the second light spot is commenced. Accordingly, it is possible to confirm the postage stamp signal whereby to further decrease erroneous signals caused by matters other than the postage stamp by applying the postage stamp detecting signal to delay circuits, and by adding a postage stamp detecting circuit utilizing the well known single light spot scanning in parallel with the postage stamp detecting circuit corresponding to the second light spot.

In addition to the above-mentioned three features, the logic circuit shown in FIGS. 5A and 5B can also discriminate the colour of the pattern. Further, colour signals of the patterns are derived only when a plurality of conditions are perfectly satisfied in the colour absorption band of the pattern and when none of said conditions is satisfied in the reflection band but all signals are eliminated in other ambiguous conditions. As a result, the probability of erroneously perceiving alphabets and the like written on the letter as the postage stamp is greatly reduced, practically to zero.

In the above embodiment, in order to provide colour signals "1," "2" and "3" of respective colours the sum of the outputs from a plurality of feature detecting circuits was used and the difference between them was used to erase colour negative signals "$\overline{1}$," "$\overline{2}$" and "$\overline{3}$." In this case the AND circuit is necessary but the OR circuit is not always necessary. For example, the arrangement shown in FIG. 5 may be modified so as to remove OR circuits 281, 282 and 283 of one or all of detecting circuits 101, 102 and 103 for respective colours and to directly supply the outputs of multivibrators 261', 262' and 263' to NOT circuits 291, 292 and 293.

In this case limitations for the reflection band of colours is somewhat alleviated thus increasing the probability of generating erroneous signals but there arise such advantages that the construction of the apparatus is simplified and level selection of the respective Schmidt circuits becomes easier.

The above described embodiment can automatically detect the longitudinal position of the postage stamps applied on letter envelopes and also discriminate the colour of the stamps with reduced limitations on the patterns of the postage stamps and without the necessity of any special treatment other than printing of ordinary patterns. Further generation of erroneous signals due to printed alphabets and the like can be reduced.

Figure 7A:
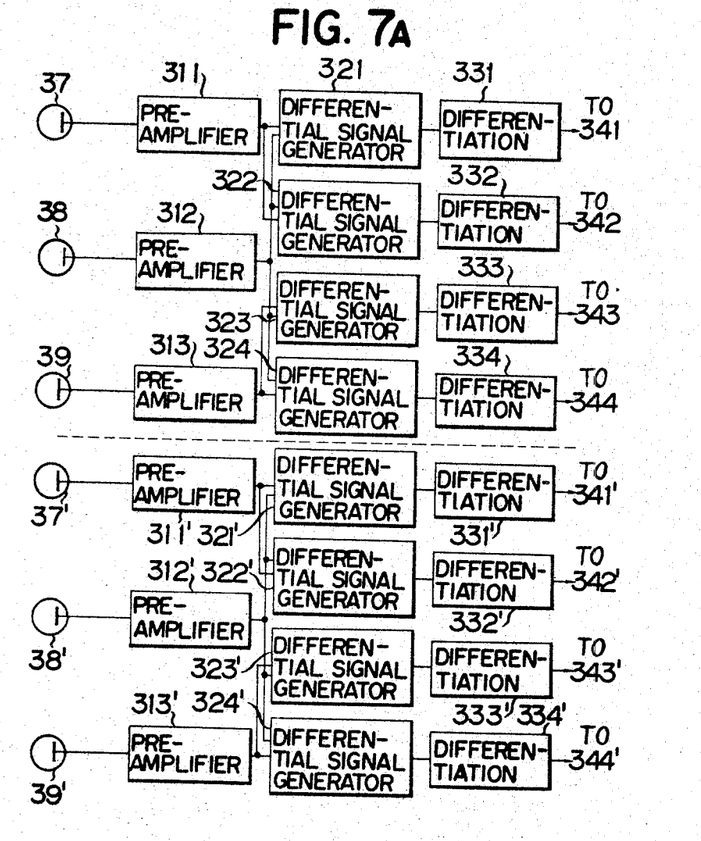
FIGS. 7A and 7B show a modification of the electrical system shown in FIGS. 5A and 5B.
Figure 7B:
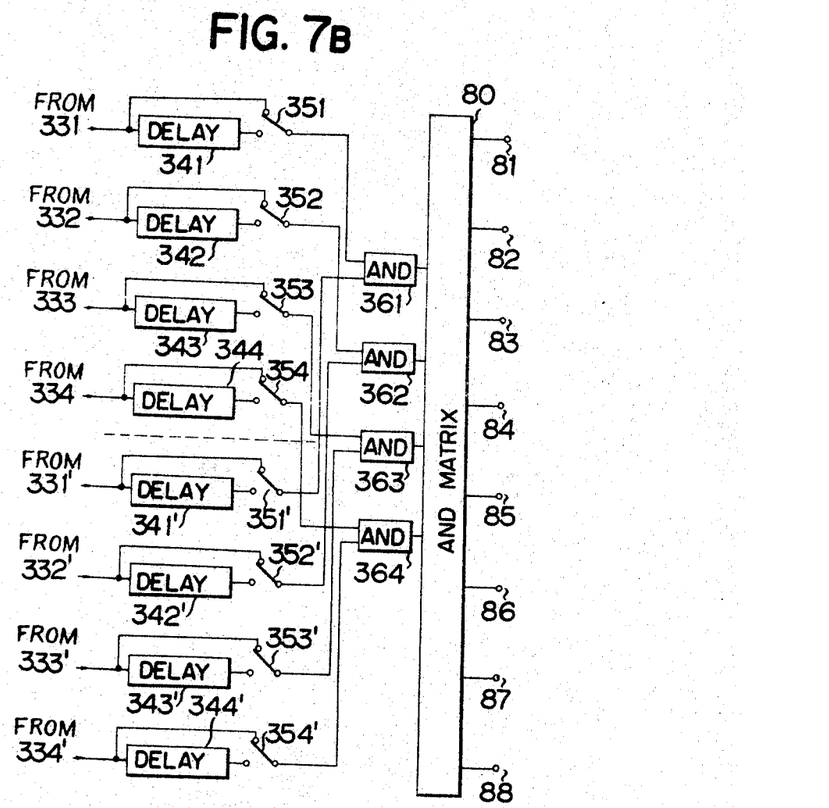
Figures 8, 10:
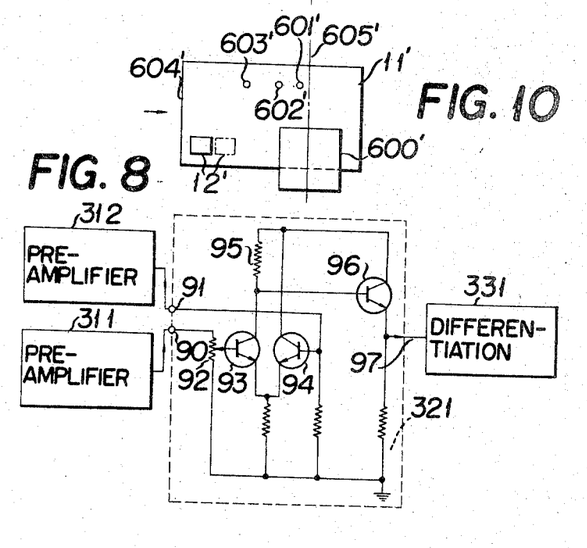
FIG. 8 shows a detailed circuit connection of a differential signal generator shown in FIG. 7A.
FIG. 10 shows a modified relative position similar to FIG. 9.

Another embodiment for identifying and detecting postage stamp 12 shown in FIG. 1 is shown in FIGS. 7A, 7B and 8.

As shown in FIGS. 7A and 7B preamplifiers 311, 311'; 312, 312' and 313, 313' are connected to photoelectric light receivers 37, 37'; 38, 38' and 39, 39', respectively. Further, differential signal generators 321, 322, 323, 324 and 321', 322', 323', 324' are provided to generate rectangular signal waves only when the difference between output voltages from respective pairs of preamplifiers 311 and 312; 312 and 313; 311' and 312'; 312' and 313' exceeds a certain value in the positive or negative direction. The leading and trailing edges of the rectangular output waves from the generating circuits 321, 322, 323, 324 and 321', 322', 323', 324' are supplied to respective differentiation circuits 331, 332, 333, 334 and 331', 332', 333', 334'. Output signals from the pairs of differentiation circuits 331 and 331'; 332 and 332'; 333 and 333'; 334 and 334' are supplied to AND circuits 361, 362, 363, 364, as their respective input signals, directly or through delay circuits 341, 342, 343, 344 and 341', 342', 343', 344', by means of switches 351, 352, 353, 354 and 351', 352', 353', 354'. Output signals from AND circuits 361, 362, 363, 364 are utilized to control an AND matrix 80 identical to those shown in FIG. 5B to derive colour pattern detection signals from its respective output terminals 81, 82, 83, 84, 85, 86, 87 and 88.

Differential signal generating circuits 321, 322, 323, 324 and 321', 322', 323', 324' are constructed as shown in FIG. 8. As an example, in the differential signal generator 321 shown in FIG. 8, an input terminal 90 is connected to the output terminal of a preamplifier 311 while an input terminal 91 is connected to the output terminal of a preamplifier 312. The input terminal 90 is coupled to the base electrode of a transistor 93 while the input terminal 91 is connected to the base electrode of a transistor 94.

When the base potential of the transistor 93 is equal to or lower than the base potential of the transistor 94, current will flow only through the transistor 94 and the collector potential of the transistor 93 is substantially equal to the voltage of a source connected across collector electrodes of respective transistors and ground. When the potential difference between terminals 90 and 91 exceeds a certain value determined by a variable resistor 92 so that the base potential of the transistor 93 becomes higher than that of the transistor 94, current will flow through the transistor 93 and the collector potential thereof will be decreased by a load resistor 95. This collector potential is transferred to the input terminal 97 of the differentiation circuit 331 through a transistor 96 serving as an emitter follower.

The operation of the apparatus having the above described construction and arrangement for detecting a red pattern, for example, is as follows:

When preamplifiers 312 and 313 among preamplifiers 311, 312, 313 and 311', 312', 313' generate a signal having a waveform as shown by solid lines in FIG. 6 and preamplifiers 312' and 313' generate a signal having a waveform as shown by the dashed lines, input signals for the differential signal generators 323, 324, 323' and 324' are insufficient to operate them, while signals for signal generators 321, 321', 322 and 322' are sufficient. Since any of the differential signal generators operate when an input of definite polarity is fed thereto only the generators, for example, 321 and 321' among 321, 322, 321' and 322' operate for the coloured portion of the stamp. Differential signal generators 321 and 321' generate rectangular waves having a width corresponding to the width of the coloured pattern, whereby the differentiation circuit 331 operates to detect the trailing edge of the rectangular wave generated by the differential signal generating circuit 321 while the differentiation circuit 331' operates to detect the leading edge of the rectangular wave from the differential signal generator 321'. The outputs of circuits 331 and 331' are supplied to the AND matrix 80 through an AND circuit 361.

The AND matrix 80 operates to combine differential outputs of read "1," green "2" and blue "3" according to Table I below to provide one signal from terminals 81 to 88.

TABLE I

| Output terminal: | Input signal | | | | Colour of pattern |
|---|---|---|---|---|---|
| | 1-2 | 2-1 | 2-3 | 3-2 | |
| 81 | 1 | 0 | 1 | 0 | Orange. |
| 82 | 1 | 0 | 0 | 1 | Magenta. |
| 83 | 1 | 0 | 0 | 0 | Red. |
| 84 | 0 | 1 | 1 | 0 | Green. |
| 85 | 0 | 1 | 0 | 1 | Light blue. |
| 86 | 0 | 1 | 0 | 0 | Cyanic. |
| 87 | 0 | 0 | 1 | 0 | Yellow. |
| 88 | 0 | 0 | 0 | 1 | Bluish purple. |
| None | 0 | 0 | 0 | 0 | Not coloured. |

Consequently, in the example described above as the signal is supplied from AND circuit 361 alone, terminal 83 supplies a signal which is identified and detected as the red pattern. Should noise waveforms caused by patterns of nearly no colour appear at the input of this AND circuit, none of the differential signal generators 321, 322, 323, 324; 321', 322', 323', 324' reaches the operation level so that AND matrix 80 will not provide any output, thus eliminating the problem of misjudging non-coloured patterns as coloured patterns.

Thus, the embodiment shown in FIGS. 7A and 7B can positively detect signals generated by coloured patterns and in addition there is no fear of producing erroneous signals in the case of substantially no colour. A system utilizing light receivers for only three colours to detect pattern signals by respective light receiver outputs can identify only six types of colours excepting white and black, whereas this embodiment can identify eight types of colours, thus greatly improving the ability of colour identification.

While the foregoing embodiments refer to arrangements wherein light receivers for three colours are employed and coloured patterns of postage stamps and the like are detected and identified by scanning them by means of two light spots, they may be modified in the following way but with the same satisfactory results.

More particularly, the number of light receivers having different spectrum sensitivities is not limited to three but may be of any number larger than two when two light receivers are used, the number of differential signal generators shown in FIG. 7A may be two and the colours of the pattern are classified into two types. Where four light receivers are used six differential signal generators are used to classify colours of the pattern into twenty-six kinds. Generally, by utilizing $n$ light receivers, theoretically colours of $(3^{(n-1)}-1)$ types can be identified. Although in the above example, outputs of light receivers for colours which are adjacent each other on the spectrum (e.g. red-green and green-blue in the case of three colours) are supplied to the differential signal generators, such differential signal generators may be provided for all combinations of colours. In a case where light receivers for three colours are utilzed, by detecting differences between 3–1 and 1–3 for red-blue, the classification of colours shown in Table I becomes more minute. In other words, classification of up to sixteen types become possible as shown in Table II below.

TABLE II

| Colour classification of Table I | Differential signals of red-blue | |
|---|---|---|
| | 3–1 | 1–3 |
| Orange | 0 | 1 |
| Magenta | 1 | 0 |
| | 0 | 1 |
| | 0 | 0 |
| Red | 0 | 1 |
| | 0 | 0 |
| Green | 1 | 0 |
| | 0 | 1 |
| | 0 | 0 |
| Light blue | 1 | 0 |
| Cyanic | 1 | 0 |
| Yellow | 0 | 1 |
| | 0 | 0 |
| Bluish purple | 1 | 0 |
| | 0 | 0 |

Thus, increase in the number of either the light receivers or the differential signal generators results not only in the increase in the number of colours that can be classified but also in the decrease of the tolerance for the spectral reflectance curve required for generating the colour pattern signal. Thus by providing a suitable means capable of increasing the number of colours that can be classified and by utilizing only colour signals of the limited number of types from among the outputs of the AND matrix 80 the probability of generating erroneous signals by other patterns with similar colour as the coloured pattern to be detected could be minimized.

Further while in the circuit shown in FIGS. 7A and 7B only the difference signals between red "1" and green "2" and between green "2" and blue "3" are used, if circuits for detecting the colour level, leading edges and trailing edges of respective colour signals shown in FIGS. 5A and 5B were incorporated into the circuit shown in FIGS. 7A and 7B, identification of colour patterns could be made more accurately.

Although the differential signal generator shown in FIG. 8 is only one example of arrangements for simultaneously effecting the detection of the difference between outputs of two light receivers and on-off conversion, the same results could be realized by deriving the potential difference between two signals, amplifying it and then effecting on-off conversion by means of a conventional Schmidt trigger circuit or the like.

Thus according to this embodiment coloured patterns can be accurately detected and identified without any misjudgment so that this embodiment is particularly useful for automatic treatment of postal matters and the like. It has great utility because it can positively prevent misjudgment of uncoloured portions.

Each of the above embodiments may also be provided with means for limiting portions to be detected and adapted to selectively scan and detect only portions bearing postage stamps thus greatly decreasing the probability of generating erroneous detected signals.

A further embodiment of this invention provided with means for limiting portions to be detected will be described below with reference to FIGS. 9 through 15.

FIG. 9 shows a relative position of a postage stamp detector 600 and first to third terminal detecting elements 601, 602 and 603 which are spaced by a predeterminal distance in the running direction of a postal matter 11 which is conveyed at a predetermined speed in the direction of the arrow. FIG. 10 shows a relative position of a postage stamp detector 600' and first to third terminal detecting elements 601', 602' and 603' of the identical construction as said detecting elements where the postal matter 11' is conveyed in the opposite direction as shown by the arrow.

In these embodiments the postage stamp detector 600 or 600' is respectively comprised by an optical system shown in FIG. 2 and operates to detect the postage stamp 12 or 12' which is applied on the left upper cover of the postal matter 11 which is conveyed in the direction of its longitudinal axis, then photoelectrically convert the detected signal to generate by succeeding logical circuits postage stamp signals discriminating ordinary mails and special delivery mails. These detectors may have a circuit construction as shown in FIGS. 5A and 5B. The terminal detecting elements 601, 602, 603 and 601', 602', 603' may be comprised by optical systems each consisting of a small electric lamp and a photo-electric converting element such as a solar cell. These terminal detecting elements operate to detect the left end 604 or 604' of the postal matter 11 and to photoelectrically convert the detected signals into electric signals to be described later.

In order to set the portion to be detected and scanned in the range of 1 to 70 millimetres from the left hand edge of the postal matter conveyed in the longitudinal direction, the spacing between the center line 605 of the optical system comprising the postage stamp detector 600 shown in FIG. 9 and the first terminal detecting element is set to be equal to one-half of the height of the postage stamp to be detected (for example 22.5 millimetres)+1 millimetre+(delayed time of generating the postage stamp signal by the electrical system of the postage stamp detector 600 which is calculated in terms of the running distance of the postal matter 11).

The spacing between the center line 605' of the optical system comprising the postage stamp detector 600' shown in FIG. 10 and the first terminal detecting element 601' is set to be equal to (one-half of the height of the postage stamp to be detected)+1 millimetre+(delayed time of generating the postage stamp signal by the electrical system of the postage stamp detector 600' which is calculated in terms of the running distance of the postal matter 11).

The spacing between the first and second terminal detecting elements 601, 602 and 601', 602' shown in FIGS. 9 and 10 is set to be 20 to 30 millimetres and the spacing between the second and third terminal detecting elements 602, 603 and 602', 603' shown in FIGS. 9 and 10 is set to be 25 to 50 millimetres.

Figure 11:
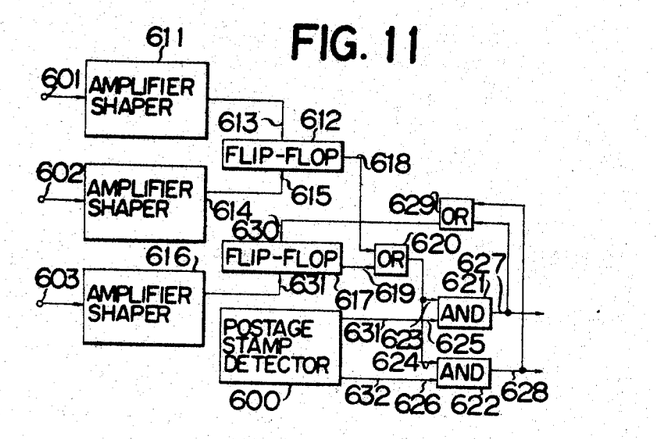
FIG. 11 is a block diagram of one example of the electrical system utilized for limiting portions to be detected.

FIG. 11 shows the circuit arrangement of one embodiment of this invention wherein the postal matter 11 is conveyed in the direction of an arrow as shown in FIG. 9 and the first to third terminal detecting elements 601, 602 and 603 and the postage stamp detector 600 are arranged in a manner described hereinbefore. The output terminal of the first terminal detecting element 601 is connected to a first input terminal 613 of a first flip-flop circuit 612 through an amplifier shaper circuit 611.

In the same manner, the output terminal of the second terminal detecting element 602 is connected to a second input terminal 615 of said first flip-flop circuit 612 through an amplifier shaper circuit 614. The output terminal of the third terminal detecting element 603 is similarly connected to a second input terminal 631 of a second flip-flop circuit 617 via an amplifier shaper circuit 616.

Output terminals 618 and 619 of the first and second flip-flop circuits 612 and 617 are respectively connected to corresponding terminals of a first OR circuit 620, output terminals thereof being respectively connected to first input terminals 623 and 624 of first and second AND circuits 621 and 622.

The postage stamp detector 600 is provided with an output terminal 631 corresponding, for example, to the output terminal 52 which represents the magenta postage stamp of the AND matrix circuit 50 shown in FIG. 5B and an output terminal 632 corresponding to the output terminal 51 of the AND matrix circuit 50. Output terminals 631 and 632 are respectively connected to second terminals 625 and 626 of the first and second AND circuits 621 and 622.

Output terminals 627 and 628 of the first and second AND circuits 621 and 622 are connected to corresponding input terminals of a second OR circuit 629, the output terminals thereof being connected to the first input terminal 630 of the second flip-flop circuit 617.

The operation of this embodiment will now be described by referring to FIG. 12.

When the left hand end 604 of the postal matter 11 moving in the direction shown by the arrow at a predetermined speed reaches the first terminal detecting element 601 at the time 641, the terminal detecting element optically detects the left hand end 604 of the postal matter 11 to provide an output signal 642 having a width determined by the time constant of the amplifier shaper circuit 611 at its output terminal. This output signal 642 is impressed upon the first input terminal 613 of the first flip-flop circuit 612 causing it to switch into its conductive state to generate an output signal 643 having a predetermined width at its output terminal 618. This output signal 643 is passed through the first OR circuit 620 and then from the output terminal thereof to the first input terminals 623 and 624 of the first and second AND circuits 621 and 622.

At this time the postage stamp detector 600 is just scanning and detecting a portion corresponding to the first postage stamp applied to the left upper portion of the postage matter 11 moving longitudinally (i.e., the portion corresponding to a range of from 20 to 30 millimetres from the left hand edge 604 to generate at its output terminals 631 and 632 a postage stamp detecting signal 644 having a predetermined width, which is applied to the second input terminals 625 and 626 of the first and second AND circuits 621 and 622.

Thus the postage stamp detecting signal 644 is applied to the first input terminal 630 of the second flip-flop circuit 617 through the first and second AND circuits 621 and 622 and a second OR circuit 629 to cause the flip-flop circuit 617 to switch into its conductive state thus generating at its output terminal 619 an output signal 645 of a predetermined width.

When the left hand end 604 of the postal matter 11 arrives at the second terminal detecting element 602 a similar output signal 647 will appear at the output terminal of the amplifier shaper circuit 614, said output signal 647 being later than the output signal 642 by an interval 646 corresponding to the spacing between said first and second terminal detecting elements 601 and 602. The output signal 647 is applied to the second input terminal 615 of the first flip-flop circuit 612 to restore it to its original state or non-conductive state, thus removing output signal 643 from its output terminal 618.

At this time, however, the first OR circuit 620 still remains in its conductive state since its input terminal is continuously energized by the signal 645 supplied from the flip-flop circuit 617 maintained in the conductive state.

When the left hand end 604 of the postal matter 11 arrives at the third terminal detecting element 603 a similar output signal 649 will appear at the output terminal of the amplifier shaper circuit 616, said output signal 649 being later than the output signal 647 by an interval 648 corresponding to the spacing between the second and third terminal detecting elements 602 and 603. The output signal 649 is applied to the second input terminal 618 of the second flip-flop circuit 617 to restore it to the original state or non-conductive state, thus removing said output signal 645 from its output terminal 619. As a result, during the next interval the first OR circuit 620 will again be set to the non-conductive state so that the first and second AND circuits 621 and 622 are also maintained in their non-conductive state to remove the postage detecting signal from the postage stamp detector 600 thus completing the detecting and scanning cycle.

During the interval in which the left hand end 604 of the postal matter 11 travels from the second detecting element 602 to the third detecting element 603, the postage stamp detector 600 is acting to detect and scan portions corresponding to the second and following postage stamps applied to the upper left portion of the postal matter 11 (portions corresponding to a range of from 30 to 70 millimetres from the left hand end). Should these portions carry postage stamp or stamps, an output signal 650 represented by dot and dashed lines and identical to said output signal 644 would appear at an output terminal 632 corresponding to special delivery mail. This signal 650 may be utilized to discriminate special delivery mails from ordinary mails.

From the foregoing description it will be clear that since this embodiment operates to detect and scan only the portions possibly carrying the postage stamp (in the above described embodiment, the portion in the range of 70 millimetres from the left hand end 604 of the postal matter 11), even if such postal matter carries alphabets or patterns sensible to the postage stamp detector on its right hand side, there is no fear of producing an erroneous detection signal due to such characters or patterns. Thus this embodiment can greatly decrease the probability of producing erroneous detection signals over prior art identifying apparatus.

Figure 13:
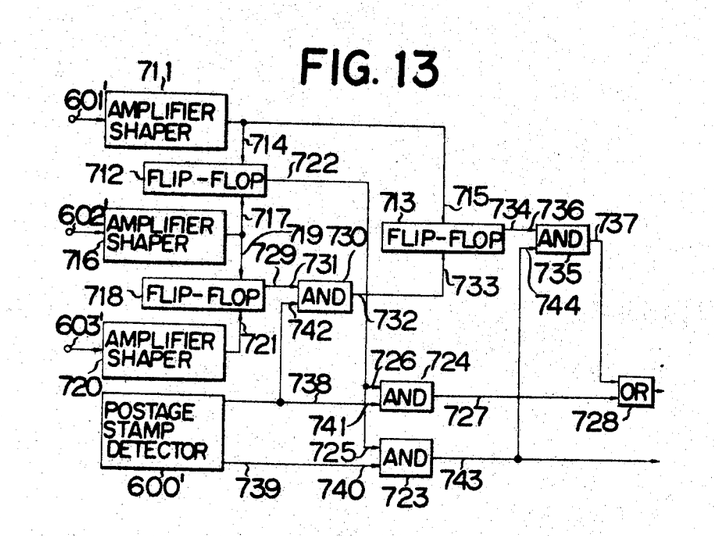
FIGS. 13 and 15 show block diagrams of modified electrical systems different from that shown in FIG. 11.

FIG. 13 is a block diagram of a still further embodiment of this invention wherein a postal matter 11' is conveyed longitudinally as in the case of FIG. 10 and a postage stamp detector 600' and the first to third terminal detecting elements 601', 602' and 603' are arranged according to the relation mentioned above. The output terminal of the first terminal detecting element 601' is connected to second input terminals 714 and 715 of first and second flip-flop circuits 712 and 713 via a similar amplifier shaper circuit 711, whereas the output terminal of the second terminal detecting element 602' is connected to a first input terminal 717 of the first flip-flop circuit 712 and to a second input terminal 719 of a third flip-flop circuit 718 through an amplifier shaper circuit 716.

Further the output terminal of the third terminal detecting element 603' is connected to the first input terminal 721 of the third flip-flop circuit 718 through an amplifier shaper circuit 720.

The output terminal 722 of the first flip-flop circuit 712 is connected to first input terminals 725 and 726 of first and second AND circuits 723 and 724, an output terminal 727 of the second AND circuit 724 being connected to a corresponding input terminal of an OR circuit 728.

An output terminal 729 of the third flip-flop circuit 718 is connected to first input terminal 731 of a third AND circuit 730, an output terminal 732 thereof being connected to a first input terminal 733 of the second flip-flop circuit 713.

An output terminal 734 of the second flip-flop circuit 713 is connected to a first input terminal 736 of a fourth AND circuit 735 and an output terminal 737 thereof is connected to a corresponding terminal of the OR circuit 728.

The postage stamp detector 600' is provided with an output terminal 738 for the special delivery mail and an output terminal 739 corresponding to ordinary mails which are identical to the output terminals 631 and 632 shown in FIG. 11, these output terminals 738 and 739 being connected to second input terminals 740 and 741 of the first and second AND circuits 723 and 724. The output terminal 738 is also connected to a second input terminal 742 of the third AND circuit 730.

An output terminal 743 of the first AND circuit 723 is conected to a second input terminal 744 of the fourth AND circuit 735, and the output terminal 727 of the second AND circuit 724 is connected to an corresponding input terminal of the OR circuit 728.

Figure 14:
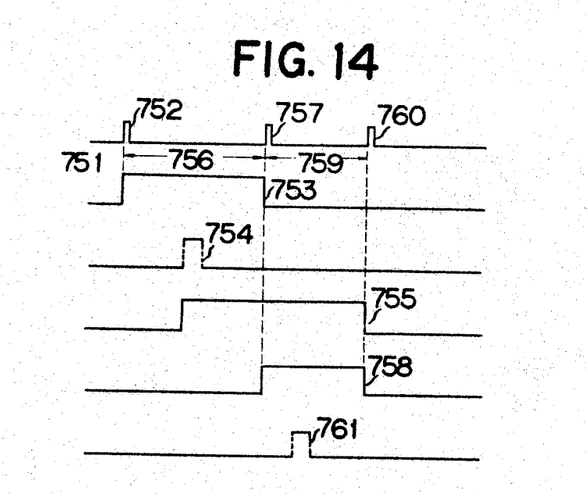
FIG. 14 shows waveforms at various portions of the circuit shown in FIG. 13.

The operation of this embodiment is described as follows by referring to FIG. 14. When the left hand end 604' of a postage matter 11' running in the direction of an arrow at a predetermined speed arrives at the third terminal detecting element 603' at the time 751, the detecting element 603' operates to optically detect the left hand portion 604' of the postal matter 11' to provide at the output terminal of the amplifier shaper circuit 720 an output signal 752 of a width as determined by the time constant of the amplifier shaper circuit. This output signal 752 is applied to the first input terminal 721 of the third flip-flop circuit 718 to cause it to switch into its conductive state, thus providing an output signal 753 at its output terminal 729. Accordingly the output signal 753 is directed to the first input terminal 731 of the third AND circuit 730.

Should the left hand portion 604' of the postal matter 11' between the third terminal detecting element 603' and the second terminal detecting element 602' (portions in the range of from 30 to 70 millimetres, for example, from the left hand edge) carry the second and following postage stamps for the special delivery mail, a postage stamp detection signal 754 shown by voltage lines would appear at the output terminal 738 corresponding to the special delivery mail of the postage stamp detector 600', and this signal 754 will be supplied to the second input terminal 742 of the third AND circuit 730.

Thus, where the postal matter carries postage stamps for special delivery mail the third AND circuit 730 will be set into its conductive state to apply the signal 754 to the first input terminal 733 of the second flip-flop circuit 713 from its output terminal 732.

Thus the flip-flop circuit 713 is switched into its conductive state to apply an output signal 755 to the first input terminal 736 of the fourth AND circuit 735 from its output terminal 734.

Next when the left hand edge 604' of the postal matter 11' arrives at the second terminal detecting element 602', a similar output signal 757 lagging from the signal 752 by an interval 756 corresponding to the spacing between the second and third terminal detecting elements 602' and 603' will appear at the output terminal of the amplifier shaper circuit 716. This output signal 757 is applied to the second input terminal 719 of the third flip-flop circuit 718 as well as to the first input terminal 717 of the first flip-flop circuit 712.

Accordingly, the output signal 757 restores to the original non-conductive state the third flip-flop circuit 718 to remove signal 753 from its output terminal 729 and to cause the first flip-flop circuit 712 to switch into its conductive state, thus applying an output signal 758 of a predetermined width to the first input terminals respectively of the first and second AND circuits 723 and 724 through its output terminal 722.

Further, when the left hand portion 604' of the postal matter 11' arrives at the first detecting element 601' a similar output signal 760 lagging from the output signal 757 by an interval 759 corresponding to the spacing between the first and second terminal detecting elements 601' and 602' will appear at the output terminal of the amplifier shaper circuit 711. This output signal is applied to the second input terminals 714 and 715 respectively of the first and second flip-flop circuits 712 and 713 to set these flip-flop circuits to the original non-conductive state thus removing signals 755 and 758 from their output terminals 722 and 734.

Figure 12:
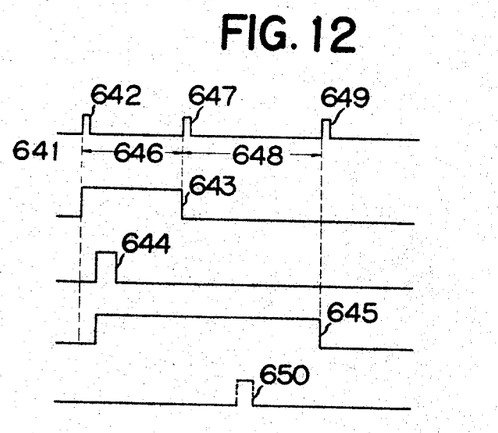
FIG. 12 shows waveforms at various portions of the circuit shown in FIG. 11.

During the interval in which the left hand portion 604' of the postal matter 11 is conveyed from the seocnd detecting element 602' to the first terminal detecting element 601', the postal stamp detector 600' operates to detect and scan the portion corresponding to the portion carrying the first postage stamp applied on the upper left portion 604' of the postal matter 11' (the portion in the range of about 20 to 30 millimetres from the left hand edge) thus providing to output terminals 738 and 739 corresponding to special delivery mail and ordinary mail an output signal 761 identical to the postage stamp detecting signal 650 shown in FIG. 12. This signal 761 is applied to the first and second AND circuits 723 and 724 thus setting these and circuits to their conductive state and the signal is derived out through their output terminals 743 and 737.

Concurrently therewith the postage stamp detection signal 761 is applied to the second input terminal 744 of the fourth AND circuit 735 through the output terminal 743 of the first AND circuit 723 to set the AND circuit 735 to its conductive state so that the postage stamp detection signal is derived out via the OR circuit 728. This detection signal 761 may be utilized to discriminate special delivery mails from ordinary mails.

Thus this embodiment also operates substantially in the same manner as previous embodiments.

Figure 15:
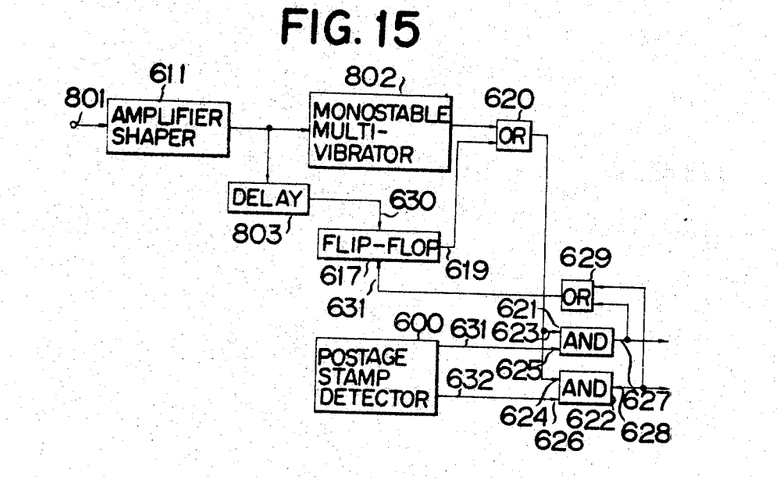

While in each of these embodiments a plurality of terminal detecting elements which are spaced by a predetermined distance along the path of travel of postal matters 11 were provided to determine the portion to be detected and scanned, by constructing the apparatus as shown in FIG. 15 only one terminal detecting element would be sufficient to perform the same function as the above described embodiments.

Considering now the case wherein the postal matter 11 and the postage stamp detector 600 are arranged in the same manner as that shown in FIG. 9, a single terminal detecting element 801 is provided at a position corresponding to that of the first terminal detecting element 601 shown in FIG. 9 and the output terminal of this detecting element 801 is connected to the input terminals of a monostable multivibrator 802 and of a delay circuit 803 via an amplifier shaper circuit 611.

The output terminal of the monostable multivibrator 802 is connected to a corresponding input terminal of the first OR circuit 620.

The output terminal of the delay circuit 803 is connected to the second input terminal 618 of the flip-flop circuit 617. Components in FIG. 15 idential to those shown in FIG. 11 are designated by the same reference numerals so that their description is believed unnecessary.

The identifying apparatus shown in FIG. 15 operates as follows:

As the left hand edge 604 of the postal matter 11 arrives at the terminal detecting element 801 at a moment 641, the terminal detecting element 801 will act to optically detect the left hand edge 604 of the postal matter 11 to provide an output signal 642 at the output terminal of the amplifier shaper circuit 611 which is applied to the input terminals of the monostable multivibration 802 and to the delay circuit 803. The monostable multivibrator 802 is constructed to provide a rectangular wave of the same width as the output signal from the flip-flop circuit 612. The delay time of the delay circuit 803 coincides with the time required for the postal matter 11 to travel from the first terminal detecting element 601 to the third terminal detecting element 603.

It is thus clear that the embodiment of this invention shown in FIG. 15 is of simpler construction than the embodiment of FIGS. 11–13 and can provide identical operation as the embodiments shown in FIGS. 11 and 13.

What is claimed is:

1. Apparatus for identifying a postage stamp indication on a postal matter, said postage stamp indication having a substantially rectangular pattern and a margin, at least a pair of opposing edge portions of said pattern having a chromatic color capable of being discriminated from said margin in the reflection band and the absorption band in the visible region of radiation, said apparatus comprising:

at least two substantially identical optical systems arranged to focus light spots with a spacing equal to or less than the spacing between said opposing edge portions of said pattern, each including:

means to focus light rays emitted from a light source to a light-spot and to project said light spot on a portion of said postage stamp indication;

at least two color filters having a different spectral transmission for separating the light rays reflected from said portion of said postage stamp indication;

and photoelectric light receivers corresponding to respective ones of said color filters for receiving the light rays passed by said color filters and generating corresponding electrical signals;

and an electrical system including:

detecting and converting means coupled to said light receivers for detecting the variation in level of the corresponding electrical signals from each of said light receivers and converting said electrical signals into respective color-characteristic signals:

a plurality of AND gates receiving said color-characteristic signals from said detecting and converting means; and an AND matrix circuit coupled to the outputs of said AND circuits to derive postage stamp indication signals corresponding to said postage stamp indication.

2. Apparatus according to claim 1, wherein each of said optical systems further comprises:

a first polarizing filter disposed in a projected light path between a light source and said postage stamp indication; and a second polarizing filter disposed in the path of the light reflected from said postage stamp indication between said color filter and said portion of the postage stamp indication;

the direction of polarized light of said first polarizing filter being perpendicular to that of polarized light of said second polarizing filter.

3. Apparatus according to claim 1, wherein said electrical system further includes a plurality of NOT circuits receiving said color-characteristic signals, said AND matrix circuit being further coupled to the outputs of said NOT circuits.

4. Apparatus according to claim 1, wherein said electrical system further includes:

a plurality of OR circuits receiving said color-characteristic signals; and a plurality of NOT circuits, each being coupled to the output of a respective OR circuit;

the output of each of said NOT circuits being coupled to said AND matrix circuit.

5. Apparatus according to claim 1, wherein said detecting and converting means includes:

a plurality of differential signal generators, the inputs of each being supplied with two selective electrical signals from a respective one of said optical systems, each differential signal generator generating a square wave signal only when the potential difference between said two input signals applied thereto exceeds a predetermined value; and a plurality of differentiation circuits, each of which is coupled to the output of one of said differential signal generators for converting said square wave signal into one of said color-characteristic signals.

6. Apparatus according to claim 1, further comprising means for limiting the portions of said postal matter to be detected, so that only portions thereof bearing said postage stamp indications are selectively scanned and detected.

References Cited

UNITED STATES PATENTS

| | | | |
|---|---|---|---|
| 1,729,521 | 9/1929 | Roddy | 250—219 X |
| 2,056,382 | 10/1936 | Ayres et al. | 250—219 X |
| 2,936,886 | 5/1960 | Harmon. | |
| 2,991,369 | 7/1961 | Grewe. | |
| 2,966,594 | 12/1960 | Hinz et al. | 250—219 |
| 3,027,830 | 4/1962 | Laeger. | |
| 3,066,226 | 11/1962 | Lindstrom | 250—223 X |
| 3,090,870 | 5/1963 | Ruckert. | |

JAMES W. LAWRENCE, Primary Examiner

D. O'REILLY, Assistant Examiner

U.S. Cl. X.R.

209—72, 111.6; 250—219, 225